(12) United States Patent
Ninose et al.

(10) Patent No.: US 6,948,033 B2
(45) Date of Patent: Sep. 20, 2005

(54) CONTROL METHOD OF THE CACHE HIERARCHY

(75) Inventors: Kenta Ninose, Yokohama (JP); Hirofumi Nagasuka, Sagamhara (JP); Masahiro Kiyoi, Kawasaki (JP); Katsuhisa Miyata, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 170 days.

(21) Appl. No.: 10/223,676

(22) Filed: Aug. 20, 2002

(65) Prior Publication Data
US 2003/0140198 A1 Jul. 24, 2003

(30) Foreign Application Priority Data
Jan. 23, 2002 (JP) ........................................ 2002-013647

(51) Int. Cl.⁷ .............................................. G06F 12/08
(52) U.S. Cl. ........................ 711/122; 711/113; 711/133; 711/141
(58) Field of Search ................................. 711/113, 122, 711/133, 141

(56) References Cited
U.S. PATENT DOCUMENTS 5,564,035 A * 10/1996 Lai ............................ 711/144
5,909,697 A * 6/1999 Hayes et al. ................. 711/144
6,065,098 A * 5/2000 Lippert ........................ 711/122
6,446,166 B1 * 9/2002 Arimilli et al. ............. 711/122
6,591,336 B2 * 7/2003 Kubo .......................... 711/113
6,715,040 B2 * 3/2004 Wang et al. ................. 711/133
2003/0188104 A1 * 10/2003 Sullivan ..................... 711/119

FOREIGN PATENT DOCUMENTS

JP      2001-117817      4/2001

* cited by examiner

*Primary Examiner*—Matthew Kim
*Assistant Examiner*—Hetul Patel
(74) *Attorney, Agent, or Firm*—McDermott Will & Emery LLP

(57) ABSTRACT

In a computer system with a plurality of levels of cache storage, a cache control method prevents data duplication among the levels of cache storage to increase cache storage utilization. A high-level cache staging unit stages reads data from a disk unit, stages the data to a high-level cache, and instructs to destage the data, which has been read, from a low-level cache. A high-level cache destaging unit writes data to be destaged to the disk unit, instructs to stage the data, which has been written, to the low-level cache, and destages the data from the high-level cache. A low-level cache staging unit stages a data, which is written by the high-level cache destaging unit, to the low-level cache. A low-level cache destaging unit destages a data, which is instructed by the high-level cache staging unit, from the low-level cache.

6 Claims, 9 Drawing Sheets

FIG. 6

CONTROL METHOD OF THE CACHE HIERARCHY

BACKGROUND OF THE INVENTION

The present invention relates to a control method of cache storage in a computer system with main storage and secondary storage that is provided to minimize a difference in access speed between a main storage and a secondary storage, and more particularly to a cache control method, for use in a computer system with multiple hierarchical levels of cache storage, to increase the utilization of cache included in the entire system.

In general, a computer system has two types of storage: one is a primary storage, such as main storage (MS), accessible directly by an instruction processor (IP) and the other is a secondary storage, such as a magnetic disk, not accessible directly by an IP. As compared with main storage, secondary storage has limitations on access methods and access speeds. For example, the access speed of a magnetic disk is much slower than that of MS.

Cache storage, or simply called a cache, is a storage provided between main storage and secondary storage to minimize a difference in access speed between main storage and secondary storage. In general, cache storage has a speed higher than that of secondary storage, and a capacity smaller than that of secondary storage. For example, the operating system of a computer system sometimes has an input/output buffer in MS. This buffer is an example of software-implemented cache storage. Also, secondary storage sometimes contains its own cache storage. For example, a disk unit contains cache storage of semiconductor memory in many cases to increase its access performance.

When a data is read from a disk unit that contains cache storage and that is connected to a computer where an operating system with an input/output buffer is running, data is first transferred from a magnetic disk of the disk unit to the cache storage of the disk unit and then from the cache storage of the disk unit to the input/output buffer in MS. After that, data is passed from the input/output buffer to a data-requesting program. In this way, multiple levels of cache storage may be provided in one computer system.

Storing data in cache storage is referred to as staging, while erasing data from cache storage as destaging. In a computer system where multiple caches are provided, the caches are called the primary cache, secondary cache, and so on, beginning with the cache closest to the IP (in other words, beginning with the cache requiring the IP to execute the smallest number of steps to access data). For example, in the above example, the input/output buffer in MS is the primary cache and cache storage in the disk unit is the secondary cache. Using those terms, the above example is described as "data is first staged from a magnetic disk of the disk unit to the secondary cache and then staged from the secondary cache to the primary cache."

In addition, from the point of view of some cache storage, cache storage with a smaller level number is called a high-level hierarchy cache, or simply called high-level cache, and cache storage with a larger level number is called a low-level hierarchy cache, or simply called a low-level cache. Using those terms, the above example is described as "data is first staged from a magnetic disk of the disk unit to a low-level (hierarchy) cache and then staged from the low-level (hierarchy) cache to the high-level (hierarchy) cache."

Although smaller than secondary storage in size, cache storage has better access performance. This is because data accessed by a usual program has locality and, therefore, retaining frequently referenced data in cache storage allows many data access requests to be satisfied by accessing cache storage. Therefore, to increase access performance with the use of cache storage, it is necessary to take full advantage of cache storage to allow more frequently used data to be staged into cache storage as frequently as possible.

If, in a computer system where multiple levels of cache storage are provided, cache storage in each hierarchy controls the staging and destaging of data independently, the same data is sometimes staged across multiple hierarchies. In this case, out of the data staged in multiple levels of cache storage, only the data in one level of cache storage, usually the data in the cache in the highest hierarchy, is actually accessed. The data in other levels of cache storage is not accessed until the data in the highest hierarchy cache is destaged. From the viewpoints of the entire computer system, this configuration results in a waste of cache storage areas and decreases the cache storage utilization. In a computer system where multiple levels of cache storage are provided, this condition should be avoided if possible.

For example, in JP-A-2001-117817, there is disclosed a cache storage control method for increasing cache storage utilization. In this control method, data to be staged into cache storage is decided according to a method (called "swap mode" in the above-mentioned JP-A-2001-117817) that is different between high-level cache storage and low-level cache storage to minimize the duplication of data staged in multiple levels of cache storage and to increase the utilization of cache storage.

It is possible to increase the utilization of cache storage of the entire system with the prior-art cache storage control method that minimizes the chance that the same data is staged across multiple levels of cache storage in a computer system with multiple levels of cache storage. However, this method has the problems described below.

One of the problems is that, if the number of hierarchical levels of cache storage in a system increases, it is difficult to select different swap modes for all hierarchies, one for each. Although several cache-storage swap modes such as LRU (Least Recently Used) and FIFO (First In First Out) are known and used, there are not so many methods that actually function efficiently and that may be implemented at a practical cost. Therefore, as the number of cache hierarchical levels included in the system increases, it becomes more difficult to select a unique swap mode for each cache storage level.

Another problem is that limiting the cache-storage swap mode as described above sometimes reduces the utilization of cache storage. As described above, an improvement in access performance with the use of cache storage requires frequently accessed data to be staged in cache storage as much as possible and, therefore, it is desirable in the swap mode that a method be employed for selecting as much frequently accessed data as possible. This is true of cache storage in every hierarchy. However, the prior-art method described above limits the selection of swap mode and prevents cache storage in each hierarchy from employing a swap mode that successfully selects frequently accessed data. This may lead to a reduction in cache storage utilization.

In addition, even if each hierarchy selects its own swap mode, data duplication cannot always be avoided.

SUMMARY OF THE INVENTION

It is an object of the present invention to provide a cache control method, for use in a computer system with multiple levels of cache storage hierarchy, that has not the limitation described above and that prevents the duplication of cache data across hierarchies.

In the method according to the present invention, staging means and destaging means are provided in each of high-level hierarchical cache storage and low-level hierarchical cache storage of a computer system. When data is staged to the high-level hierarchical cache storage, the method according to the present invention requests the destaging means of the low-level hierarchical cache storage to destage data to be staged to the high-level cache storage.

When data is destaged from the high-level hierarchical cache storage, the method according to the present invention requests the staging means of the low-level hierarchical cache storage to stage data to be destaged from the high-level cache storage.

In a computer system with multiple hierarchical levels of cache storage, staging means and destaging means are provided at each level of cache storage. The method described above may be applied to a control method of cache storage with three or more hierarchical levels by allowing cache storage at each hierarchical level to function as a lower-level cache storage of the next higher level cache storage and as a higher-level cache storage of the next lower level cache storage.

Other objects, features and advantages of the invention will become apparent from the following description of the embodiments of the invention taken in conjunction with the accompanying drawings.

DETAILED DESCRIPTION OF THE EMBODIMENTS

Some embodiments of the present invention will be described in detail below with reference to the drawings.

Figure 1:
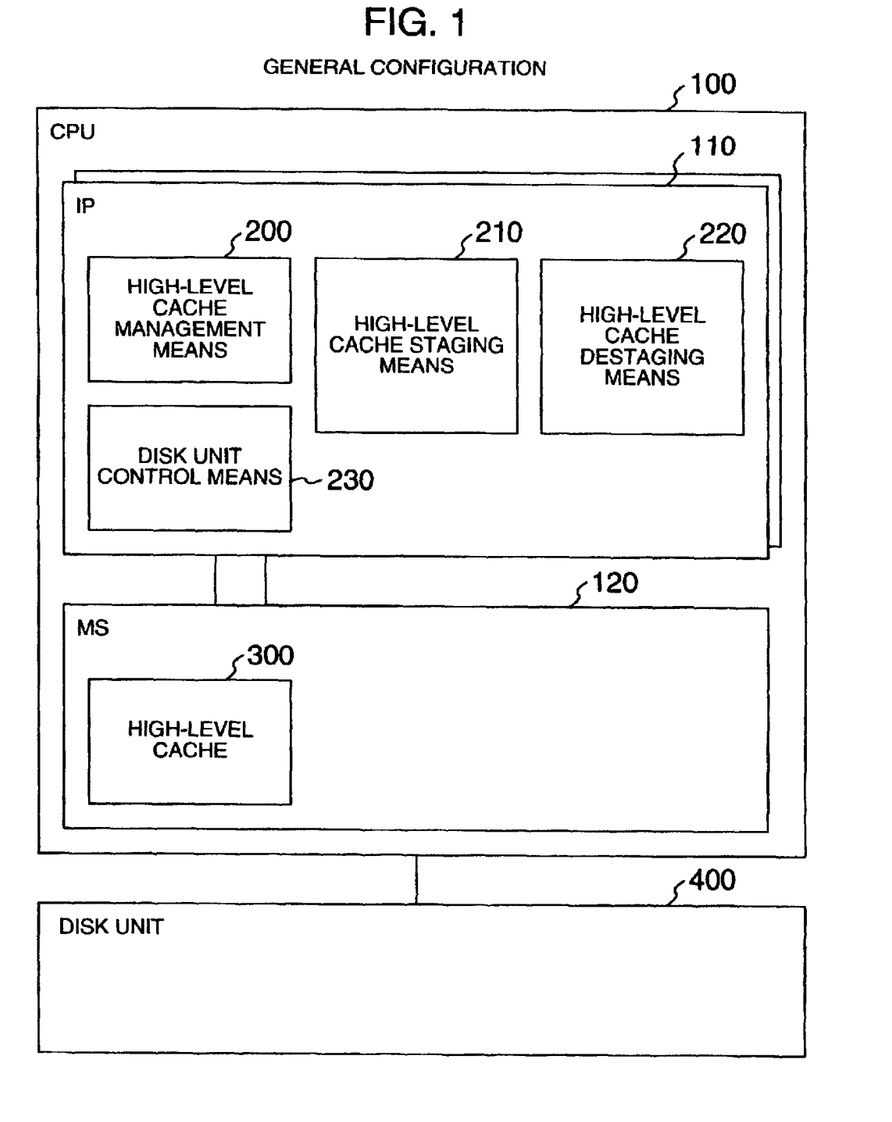
FIG. 1 is a diagram showing the general configuration of a method according to the present invention.

FIG. 1 is a diagram showing the general configuration of a method according to the present invention.

A CPU (Central processing Unit) 100 comprises a plurality of IPs (Instruction Processor) 110 and one MS (Main Storage) unit 120. All IPs 110 share the MS 120. A disk unit 400 is connected to the CPU 100. The means that run on the IP 110 include high-level cache management means 200, high-level cache staging means 210, high-level cache destaging means 220, and disk unit control means 230. The MS 120 includes a high-level cache 300.

The high-level cache management means 200, which is started in response to an input/output request from a user program, decides data to be staged to, and to be destaged from, the high-level cache 300 and starts the high-level cache staging means 210 and the high-level cache destaging means 220. The high-level cache staging means 210 uses the disk unit control means 230 to access the disk unit 400 and stores specified data into the high-level cache 300. The high-level cache staging means 210 also specifies data to be destaged from a low-level cache 450 (see FIG. 2) in the disk unit 400.

The high-level cache destaging means 220 erases specified data from the high-level cache 300. The high-level cache destaging means 220 also uses the disk unit control means 230 to specify data to be staged to the low-level cache 450. The disk unit control means 230 uses an interface provided in the CPU 100 to control the disk unit 400 and sends a read/write instruction or a staging/destaging instruction to the disk unit 400.

The high-level cache 300 may contain a plurality of pairs of data stored in a device (disk shown in FIG. 2) 460 and a data address that is positional information on the data within the device 460.

Figure 2:
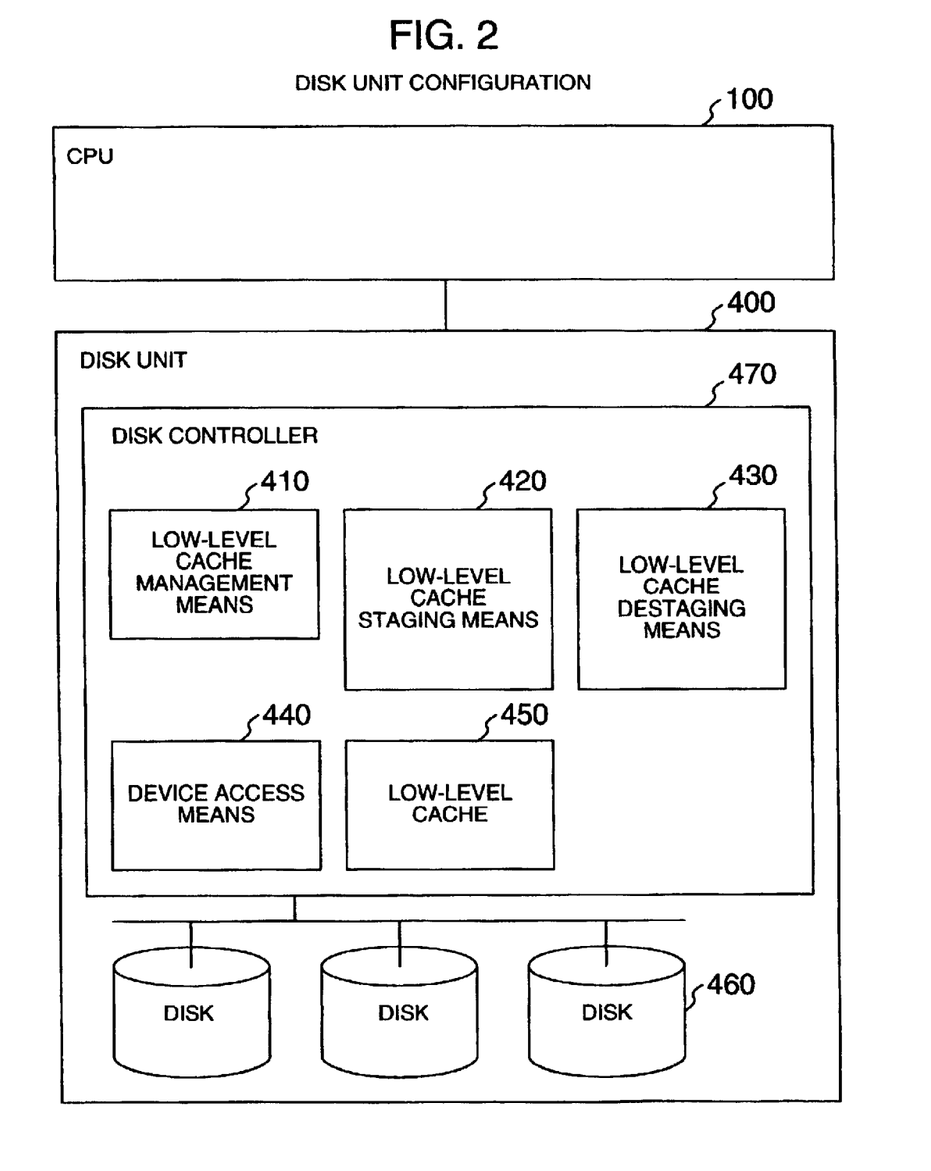
FIG. 2 is a diagram showing the configuration of a disk unit according to the present invention.

FIG. 2 is a diagram showing the configuration of a disk unit according to the present invention.

The disk unit 400 comprises a disk controller 470 and the devices 460 (disks in FIG. 2). The disk controller 470 comprises low-level cache management means 410, low-level cache staging means 420, low-level cache destaging means 430, device access means 440, and the low-level cache 450.

In response to an instruction from the disk unit control means 230, the low-level cache management means 410 decides data to be staged to, and to be destaged from, the low-level cache 450 and starts the low-level cache staging means 420 and the low-level cache destaging means 430. The low-level cache staging means 420 uses the device access means 440 to access the device 460 to store specified data into the low-level cache 450. The low-level cache destaging means 430 erases specified data from the low-level cache 450. The device access means 440 reads data from, or writes data to, the device 460.

Figure 3:
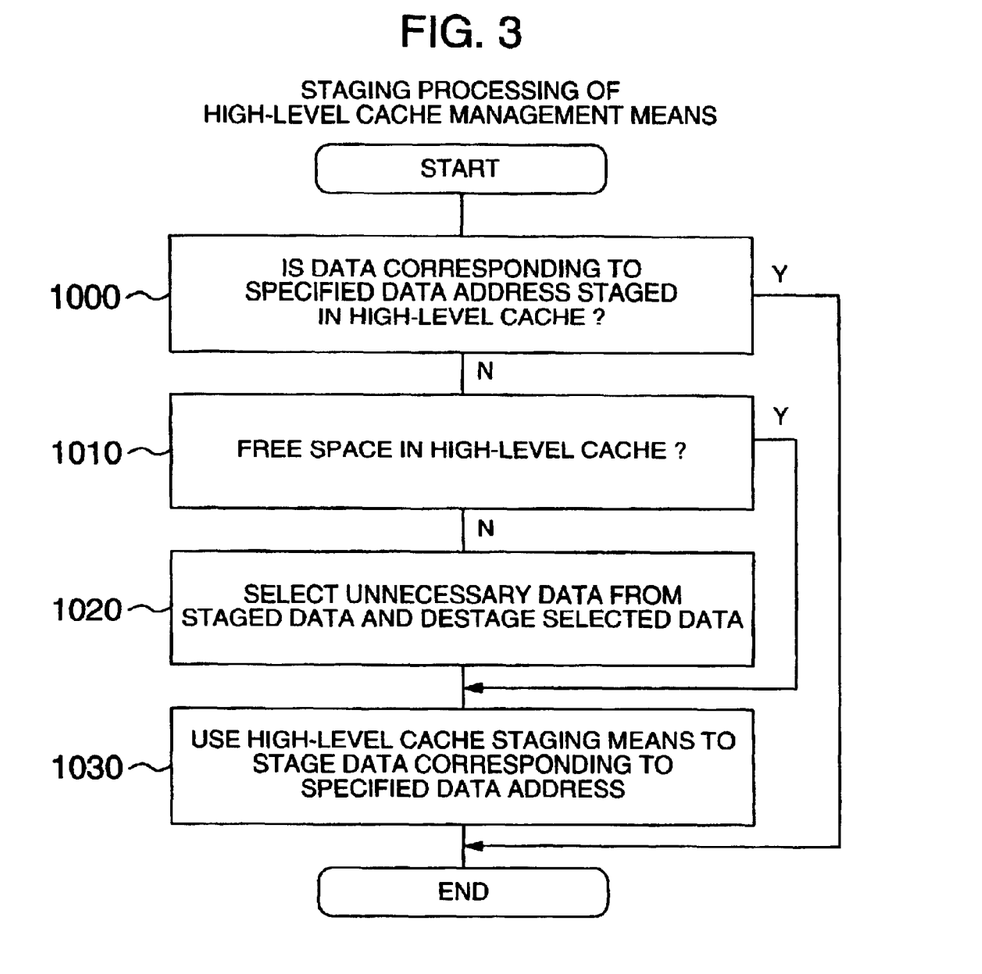
FIG. 3 is a flowchart showing staging processing of high-level cache management means.

FIG. 3 is a flowchart showing the staging processing of the high-level cache management means 200 according to the present invention.

In response to a staging processing request generated, for example, when a user program issues an input/output request, the high-level cache management means 200 checks if data corresponding to the specified data address has already been staged to the high-level cache 300 (step 1000). If the data has been staged, processing ends. If data is not staged, the high-level cache management means 200 checks if there is a free space in the high-level cache 300 (step 1010). If there is a free space, control is passed to step 1030. If there is no free space, control is passed to step 1020, unnecessary data is selected from data staged in the high-level cache 300, and the selected data is destaged. In this way, a free space is allocated in the high-level cache 300. In step 1030, the high-level cache management means 200 uses the high-level cache staging means 210 to stage data corresponding to the specified data address into the high-level cache 300.

Figure 4:
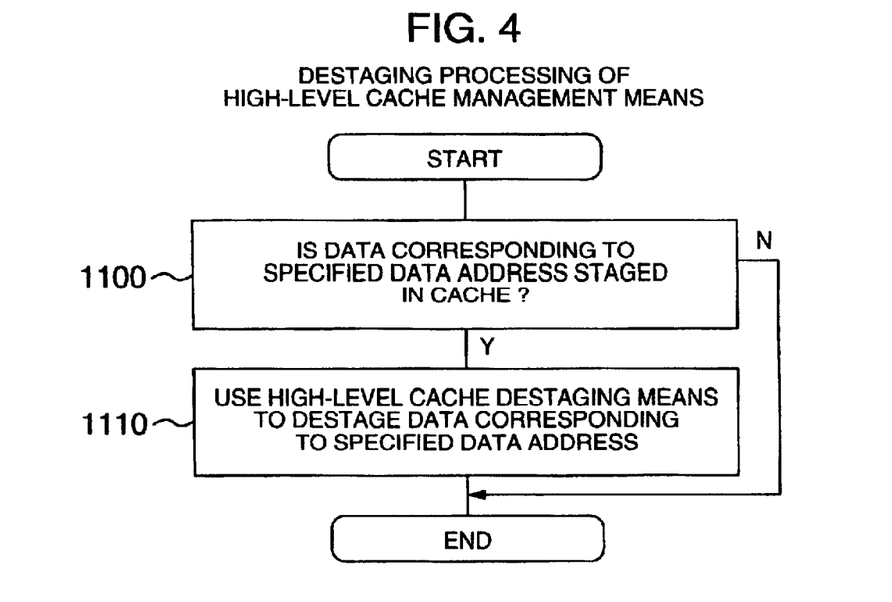
FIG. 4 is a flowchart showing destaging processing of high-level cache management means.

FIG. 4 is a flowchart showing the destaging processing of the high-level cache management means 200 according to the present invention.

When requested to perform destaging processing, the high-level cache management means 200 checks if data corresponding to the specified data address has already been staged in the high-level cache 300 (step 1100). If the data is not staged, processing ends. If the data is staged, the high-level cache management means 200 uses the high-level cache destaging means 220 to destage the data corresponding to the specified data address from the high-level cache 300.

Figure 5:
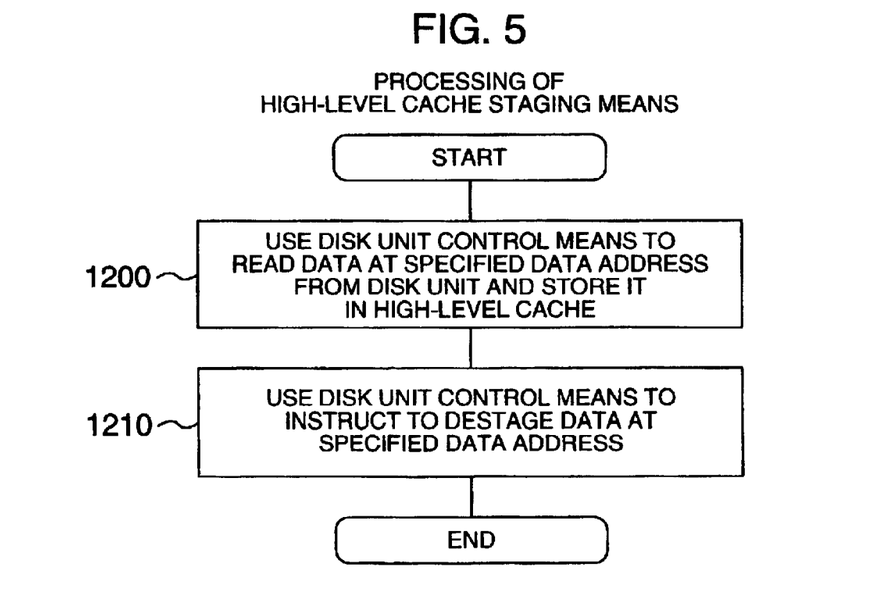
FIG. 5 is a flowchart showing processing of high-level cache staging means.

FIG. 5 is a flowchart showing the processing of the high-level cache staging means 210 according to the present invention.

The high-level cache staging means 210, which is started by the high-level cache management means 200, uses the disk unit control means 230 to read data at the specified data address from the disk unit 400 and stores the data into the free space of the high-level cache 300 (step 1200). In addition, the high-level cache staging means 210 instructs the disk unit control means 230 to destage data corresponding to the specified data address from the low-level cache 450 (step 1210). This processing destages the data, which has been staged into the high-level cache 300, from the low-level cache 450. Although the instruction to read data and the instruction to destage data to the low-level cache 450 are explicitly separated in the description of this embodiment, a command that instructs to read data and to destage data at the same time may be provided in the disk unit 400 to combine the instructions into one step.

Figure 6:
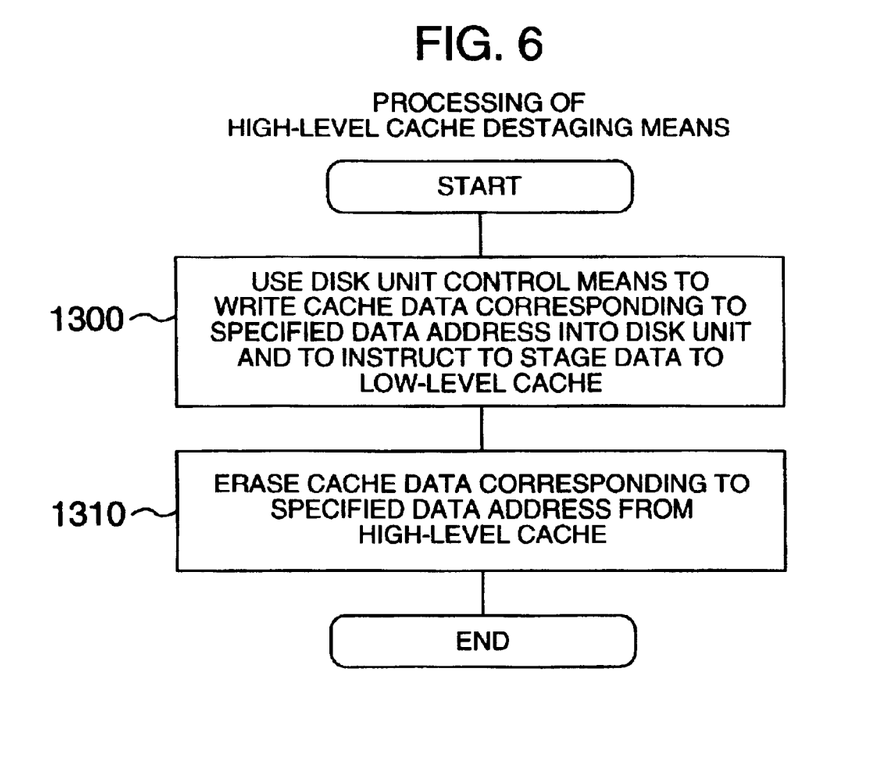
FIG. 6 is a flowchart showing processing of high-level cache destaging means.

FIG. 6 is a flowchart showing the processing of the high-level cache destaging means 220 according to the present invention.

The high-level cache destaging means 220, which is started by the high-level cache management means 200, instructs the disk unit control means 230 to write cache data corresponding to the specified data address into the disk unit 400 and instructs the disk unit control means 230 to stage data corresponding to the specified data address into the low-level cache 450 (step 1300). Next, the high-level cache destaging means 220 erases cache data corresponding to the specified data address from the high-level disk cache 300 (step 1310). This processing stages data, which has been destaged from the high-level cache 300, into the low-level cache 450.

Figure 7:
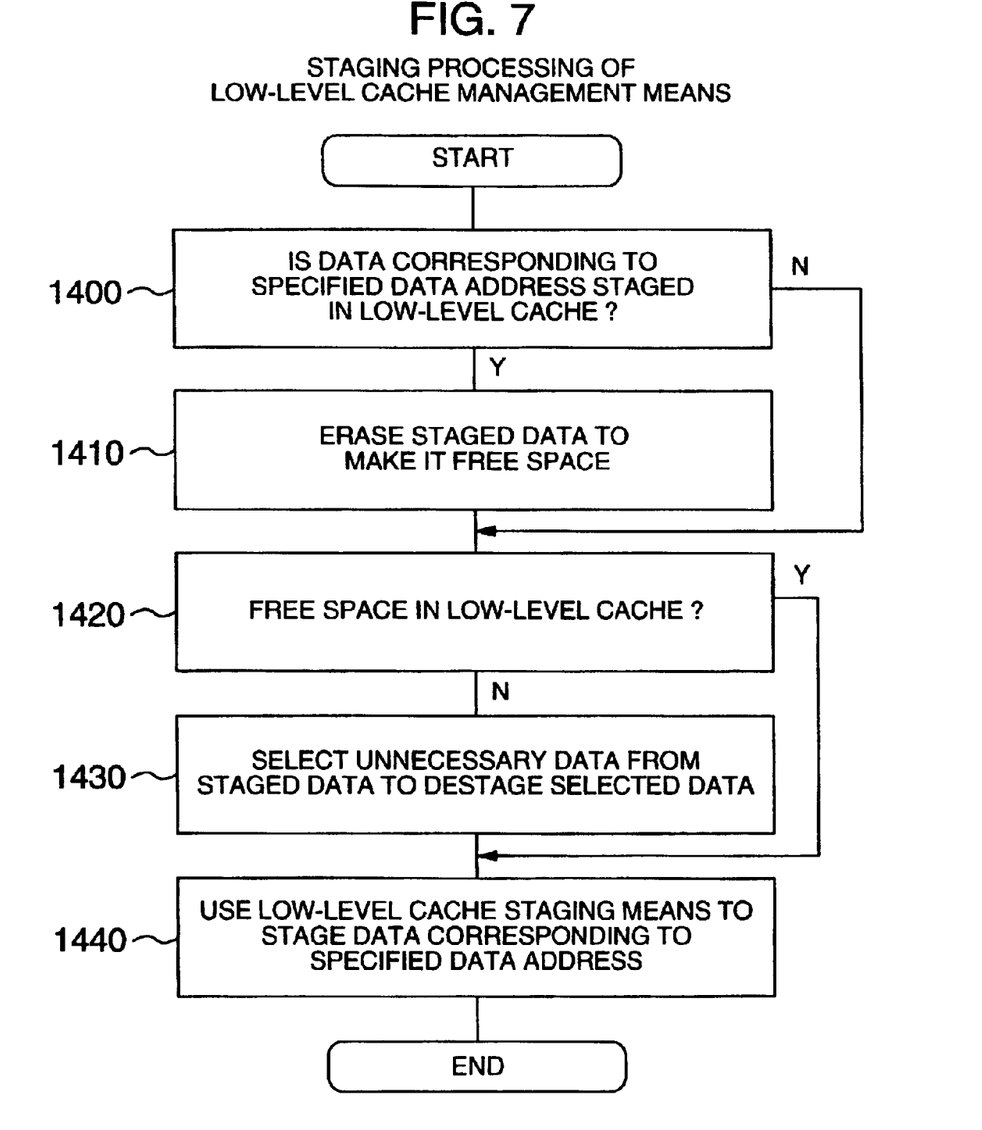
FIG. 7 is a flowchart showing staging processing of low-level cache management means.

FIG. 7 is a flowchart showing the staging processing of the low-level cache management means 410 according to the present invention. In response to a staging processing instruction issued to the disk unit 400, the low-level cache management means 410 executes staging processing.

First, the low-level cache management means 410 checks if data corresponding to the specified data address has already been staged to the low-level cache 450 (step 1400). If data is not staged, control is passed to step 1420. If data is staged, control is passed to step 1410 to erase the staged data. In step 1420, the low-level cache management means 410 checks if there is a free space in the low-level cache 450. If there is no free space, the low-level cache management means 410 selects unnecessary data from the staged data and destages the selected data (step 1430). Finally, the low-level cache management means 410 uses the low-level cache staging means 420 to stage data corresponding to the specified data address into the low-level cache 450 (step 1440).

Figure 8:
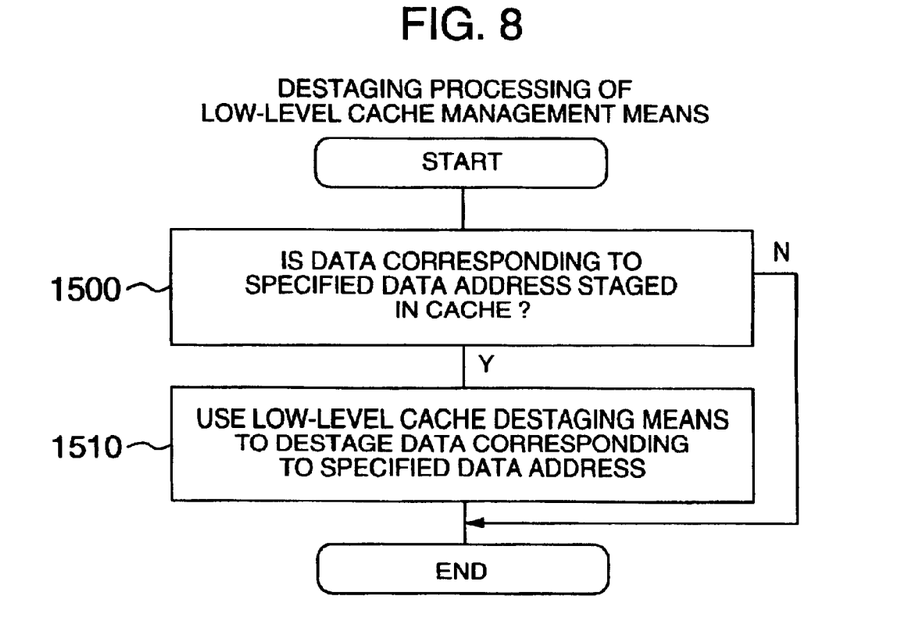
FIG. 8 is a flowchart showing destaging processing of low-level cache management means.

FIG. 8 is a flowchart showing the destaging processing of the low-level cache management means 410 according to the present invention. In response to a destaging processing instruction issued to the disk unit 400, the low-level cache management means 410 executes destaging processing.

First, the low-level cache management means 410 checks if data corresponding to the specified data address has already been staged to the low-level cache 450 (step 1500) and, if the data is not staged, ends processing. If the data is staged, the low-level cache management means 410 uses the low-level cache destaging means 430 to destage data corresponding to the specified data address from the low-level cache 450 (step 1510).

Figure 9:
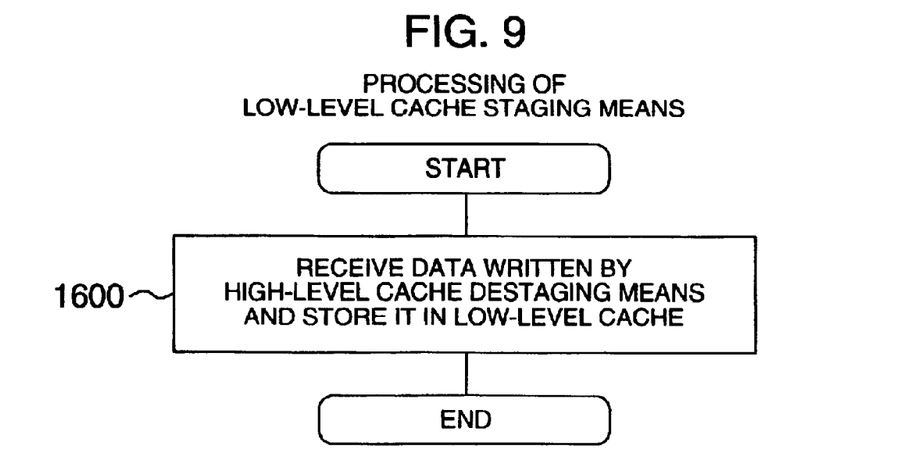
FIG. 9 is a flowchart showing processing of low-level cache staging means.

FIG. 9 is a flowchart showing the processing of the low-level cache staging means 420 according to the present invention.

In step 1600, the low-level cache staging means 420 receives data written by the high-level cache destaging means 220, stores it in a free space in the low-level cache 450, and returns control to low-level cache management means 410 as the calling means. This processing stages data, which has been destaged from the high-level cache 300, into the low-level cache 450.

Figure 10:
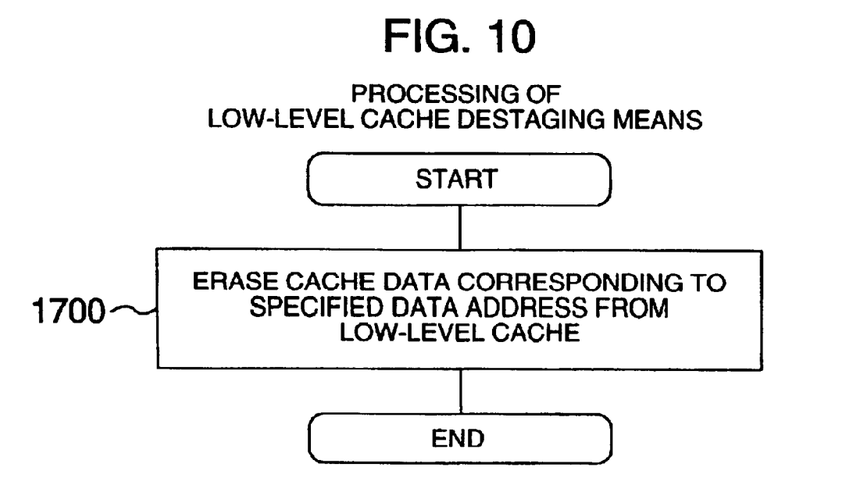
FIG. 10 is a flowchart showing processing of low-level cache destaging means.

FIG. 10 is a flowchart showing the processing of the low-level cache destaging means 430 according to the present invention.

In step 1700, the low-level cache destaging means 430 erases cache data, corresponding to the data address specified by the high-level cache staging means 210, from the low-level cache 450. This processing destages data, which has been staged to the high-level cache 300, from the low-level cache 450.

Figure 11:
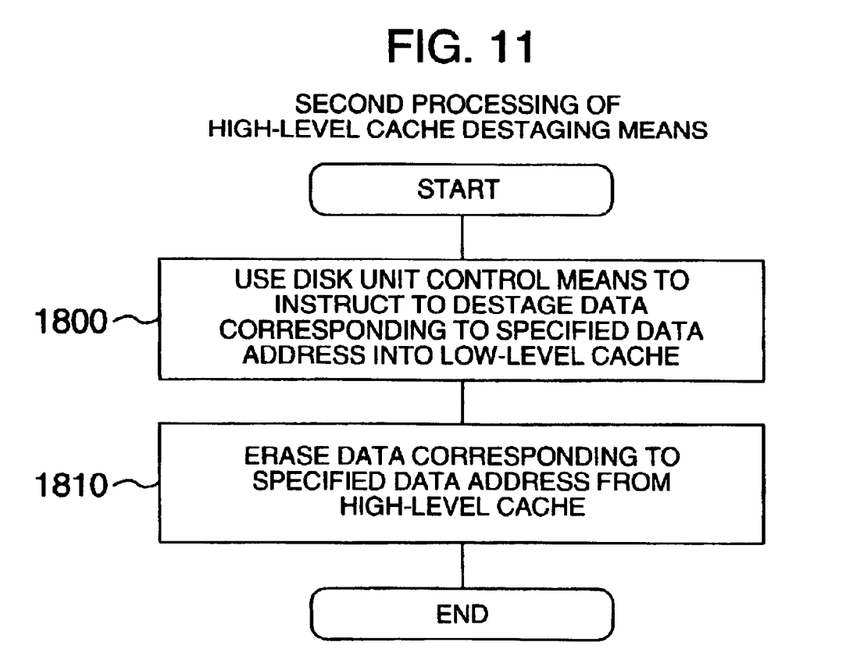
FIG. 11 is a second flowchart showing processing of high-level cache staging means.

FIG. 11 is a second flowchart of the processing of the high-level cache destaging means 220 according to present invention.

The high-level cache destaging means 220, which is started by the high-level cache management means 200, instructs the disk unit control means 230 to stage data corresponding to the specified address into the low-level cache 450 (step 1800). Next, the high-level cache destaging means 220 erases cache data corresponding to the specified data address from the high-level cache 300 (step 1810). This processing stages data, which has been destaged from the high-level cache 300, into the low-level cache 450.

This flowchart differs from the flowchart of the high-level cache destaging means 220 shown in FIG. 6 in that data is not written on the disk unit 400 in step 1800. FIG. 11 shows the processing in which data destaged from the high-level cache 300 is destaged before it is updated.

Figure 12:
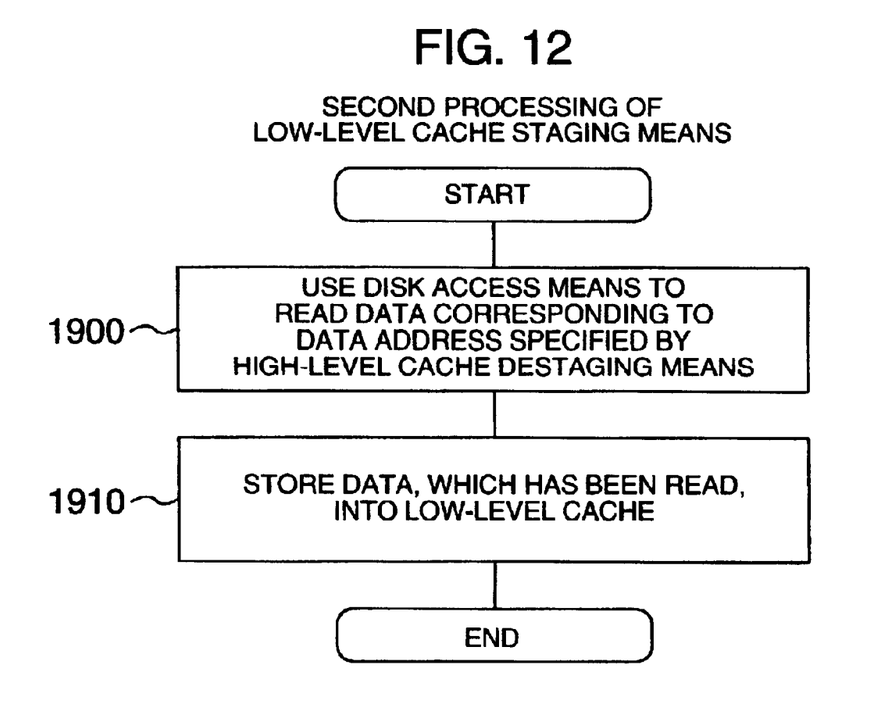
FIG. 12 is a second flowchart showing processing of low-level cache staging means.

FIG. 12 is a second flowchart of the processing of the low-level cache staging means 420 according to the present invention.

In step 1900, the low-level cache staging means 420 uses the device access means 440 to read data corresponding to the data address specified by the high-level cache destaging means 220. Next, in step 1910, the low-level cache staging means 420 stores data, which has been read, into a free space in the low-level cache 450. This processing stages data, which has been destaged from the high-level cache 300, into the low-level cache 450.

Although a computer system with two-level hierarchy storage is described in this embodiment, the present invention may be applied, in theory, to any number of levels of cache storage hierarchy. In a computer system with three or more hierarchical levels of cache storage, intermediate-level cache storage functions as the lower-level cache storage of the next higher level cache storage and as the higher-level cache storage of the next lower level cache storage. This configuration allows a computer system with a plurality of cache storage hierarchical levels to be built without special limitations.

In a computer system with a plurality of levels of cache storage, the method according to the present invention allows data to be destaged from the low-level cache when data is staged to the high-level cache and allows data to be staged to the low-level cache when data is destaged from the high-level cache. As a result, the cache utilization of the entire system is increased.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A cache control method for use in a computer system including a high hierarchical level cache storage, a low hierarchical level cache storage and a plurality of disks, said method comprising the steps of:

when data is staged to said high hierarchical level cache storage, sending a first instruction to destage the data from said low hierarchical level cache storage;

according to the first instruction, destaging the data from said low hierarchical level cache storage;

when data is destaged from said high hierarchical level cache storage to the plurality of disks, sending a second instruction to stage the data to said low hierarchical level cache storage from said plurality of disks; and according to the second instruction, staging the data to said low hierarchical level cache storage from said plurality of disks.

2. A hierarchical cache control method for use in a computer system comprising a central processing unit and a disk unit, said central processing unit comprising a plurality of instruction processors and a main storage coupled to said instruction processors, said disk unit comprising a disk controller and disks and being coupled to said central processing unit, said method comprising the steps of:

providing a high hierarchical level cache storage in said main storage, and a low hierarchical level cache storage in said disk controller;

when data is staged to said high hierarchical level cache storage, sending a first instruction to destage the data from said low hierarchical level cache storage;

according to the first instruction destaging the data from said low hierarchical level cache storage;

when data is destaged from said high hierarchical level cache storage to the disk unit, sending a second instruction to stage the data to said low hierarchical level cache storage from said disk unit; and according to the second instruction, staging the data to said low hierarchical level cache storage from said disk unit.

3. A hierarchical cache control method for use in a computer system including a high hierarchical level cache storage, a low hierarchical level cache storage and a plurality of disks, said method comprising the steps of:

issuing a first command from said computer system to instruct to destage data from said high hierarchical level cache storage to said plurality of disks when the data is staged to said high hierarchical level cache storage; and issuing a second command from said computer system to instruct to stage said data from said plurality of disks to said low hierarchical level cache storage when the data is destaged from said high hierarchical level cache storage to said plurality of disks.

4. A cache controller for use in a computer system including a high hierarchical level cache storage, a low hierarchical level cache storage and a disk unit a plurality of disks, comprising:

means for issuing a first instruction to destage data from said low hierarchical level cache storage when the data is staged to said high level cache storage;

means for destaging the data from said low hierarchical level cache storage according to the first instruction;

means for issuing a second instruction to stage data to said low hierarchical level cache storage when the data is destaged from said high hierarchical level cache storage to said plurality of disks; and means for staging the data to said low hierarchical level cache storage from said disk unit plurality of disks according to the second instruction.

5. A hierarchical cache controller for use in a computer system comprising a central processing unit and a disk unit, said central processing unit comprising a plurality of instruction processors and a main storage coupled to said instruction processors, said disk unit comprising a disk controller and disks and being coupled to said central processing unit, said controller comprising:

means for issuing a first instruction to destage data from low hierarchical level cache storage provided in said disk controller when the data is staged to high hierarchical level cache storage provided in said main storage;

means for destaging the data from said low hierarchical level cache storage according to the first instruction.

means for issuing a second instruction to stage data to said low hierarchical level cache storage from said disk unit when the data is destaged from said high hierarchical level cache storage to the disk unit; and means for staging the data to said low hierarchical level cache storage from said disk unit according to the second instruction.

6. A hierarchical cache controller for use in a computer system including a central processing unit including a main storage having a high hierarchical level cache storage and a disk unit coupled to the central processing unit and having a low hierarchical level cache storage in a disk controller thereof, said controller comprising:

means for issuing a first command to instruct to destage data from said high hierarchical level cache storage to said disk unit when the data is staged to said high hierarchical level cache storage; and means for issuing a second command to instruct to stage said data from said disk unit to said low hierarchical level cache storage when the data is destaged from said high hierarchical level cache storage to said disk unit.

* * * * *